United States Patent Office 2,940,986
Patented June 14, 1960

2,940,986

EPOXY ESTERS OF LONG CHAIN ACIDS

Herbert A. Newey, Lafayette, Calif., assignor to Shell Oil Company, a corporation of Delaware No Drawing. Filed June 17, 1957, Ser. No. 666,238

10 Claims. (Cl. 260—348)

This invention relates to epoxy esters and polymers thereof. More particularly, it relates to epoxy esters of dimers and trimers of long chain unsaturated acids, and to polymers thereof.

The prior art describes numerous epoxides having in their structure the grouping

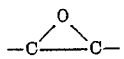

and polymers thereof. A representative material of this type is the reaction product of 2,2-bis(4-hydroxyphenol)-propane and epichlorohydrin and the polymers which are obtained therefrom. Such products have a variety of beneficial uses particularly in surface coating compositions. Many such compositions are characterized by clarity, high ultimate tensile strength, excellent water and solvent resistance, short cure times, and the like. A major disadvantage of many of the polymers of the type described is that they may be characterized by poor elongation thus making them unsuitable for exterior use on wood and on flexible surfaces such as cloth and paper and similar materials which must undergo flexing or other dimensional changes during use. It has now been found that these disadvantages are overcome when the novel products of this invention are employed in coating compositions of the type described.

It is an object of this invention to provide novel polyepoxy esters of dimers and trimers of long chain unsaturated acids and polymers thereof. It is another object of this invention to provide epoxy esters which are characterized by good flexibility. It is yet another object of this invention to provide polyglycidyl esters of dimers and trimers of fatty acids, and polymers thereof, which impart flexibility to polymers which lack such a property. Other objects will become apparent as the description proceeds.

These and other objects are accomplished by novel polyepoxy esters selected from dimers and trimers, and mixtures thereof, of unsaturated long chain aliphatic acids. The novel products of this invention also include the polymers and copolymers of the novel epoxy esters of the dimers and trimers. The polyepoxy esters of the dimer and trimer acids may be visualized as comprising two parts. One part is that which is composed of a dimer and/or trimer of long chain unsaturated aliphatic acids. The second part comprises an epoxy ester for some or all of the carboxyl radicals of the acid. In addition to such products, which are monomeric substances having from 20 to 70 carbon atoms that have not been precisely identified by structural formula, this invention also includes homopolymers and copolymers thereof.

The dimer and/or trimer acid portion of the present products are of the type that are well known in the art and include dimers and trimers that are derived from linoleic acid, linolenic acid, eleosteric acid, ricinoleic acid, and the like. Another group of dimers and/or trimers are those obtained from acids of the above type together with monoethylenically unsaturated acids as oleic acid.

Still another group of dimers and trimers are those obtained from dibasic acids such as 8,12-eicosadiene-1,20-dioic acid, 8-vinyl-10-octadecene-1,18-dioic acid, 7,11-octadecadiene-1,18-dioic acid, and the like. The dimer and trimer acids may be prepared by any known method such as by heating the acid or mixture of acids, under pressure, in the presence of water. One such process is described in greater detail in U.S. Patent 2,482,761. If desired, various catalysts may be employed in order to obtain various advantages. Such catalysts include, for example, lead acetate, fuller's earth, bentonite, crystalline clays as those described in U.S. Patent 2,793,219, and the like.

The epoxy esters of the dimer and trimer acids may be derived from the epoxides of unsaturated alcohols such as allyl alcohol, buten-1-ol-3, crotyl alcohol, penten-1-ol-5, and the like. Still other epoxy esters include those derived from higher unsaturated alcohols such as 2,6-dimethylocten-1-ol-8, and the like. Another group of epoxy esters are those derived from cyclic alcohols as 3,4-epoxycyclohexanol, 2,3-epoxycyclohexanol, and nuclear substitutes thereof, and the like.

It will be found that the properties of the present products do not vary greatly among the species of the particular dimer and/or trimer acid. The greatest difference in properties occur when the nature of the epoxy ester group is varied. In the preferred embodiment the epoxy groups are in the terminal positions, i.e., those having the structure

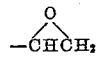

Such products are preferred because they cure rapidly and because of the superior properties of the product. The most preferred species are the glycidyl esters of the dimer and trimer acids, and polymers thereof, for the additional reason that they are most easily prepared.

The epoxy esters of the dimers and trimers may be prepared by any conventional process. The glycidyl esters are most easily prepared by the reaction of alkali metal salts of the dimer and/or trimer acids with epichlorohydrin at elevated temperatures. The above described salts are prepared by merely mixing and reacting the acid with potassium hydroxide or sodium hydroxide in an inert medium such as water, alcohol, benzene, or the like. Thereafter, the liquid medium is separated and the alkali metal salt of the acid is recovered. The salt is then reacted with epichlorohydrin at temperatures from 85° C. to about 115° C. Higher temperatures may be employed but they are not desirable as the epichlorohydrin will vaporize thus requiring the use of a pressure vessel. It will be found that temperatures in the order of 95° C. to 105° C. affords suitable conversions with short reaction times. If desired a catalyst may be employed such as various quaternary ammonium salts.

The reaction of the epihalohydrin and the salt of the acid requires that there be at least one mole of the epihalohydrin for each —COOM group wherein M is alkali metal. In practice, it is preferred that there be an excess of the epihalohydrin from 0.5 mole to 2 moles or even higher. After the reaction is complete, which takes from 30 to 120 minutes, the alkali metal halide is filtered off and the excess epihalohydrin is stripped, leaving the desired product as the residue.

Another method for preparing the products of this invention comprises esterifying the acid with an excess of an unsaturated alcohol and thereafter reacting the product with an epoxidizing agent such as peracetic acid. The epoxidation is accomplished with at least one mole of the peracid for each ethylenic double bond. More preferred, however, an excess of the epoxidizing agent is employed. The epoxidation is accomplished at temperatures ranging from about −20° C. to about 100° C. with with temperatures from −10 to 25° C. being preferred. Still other methods and techniques which are known in the art may be employed for preparing the products of this invention.

It will be appreciated that the epoxy esters of the dimers and/or trimers of the long chain aliphatic acids may have less than one epoxy group for each carboxy radical of the acid. This is simply accomplished by merely using less than the amount of the reagents needed to provide complete esterification of all the carboxy radicals.

The novel polyepoxides of this invention may be cured through the epoxy groups to form valuable polymeric products. They may be polymerized alone or with other epoxides in any proportion ranging from 5 to 95% by weight. Epoxides that may be copolymerized with the polyepoxy esters of this invention include, among others, glycidyl polyethers of polyhydric phenols obtained by reacting polyhydric phenols, such as bisphenol-A, resorcinol, and the like, with an excess of a halohydrin, such as epichlorohydrin; polyepoxide polyethers obtained by reacting an alkane polyol, such as glycerol and sorbitol, with epichlorohydrin and dehydrohalogenating the resulting product; polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides.

A great variety of different curing agents may be employed in effecting the above-described polymerizations. Such agents include, among others, carboxylic acids or anhydrides, such as oxalic acid, or phthalic anhydride; Friedel-Crafts metal halides, such as aluminum chloride, zinc chloride, ferric chloride or boron trifluoride as well as complexes thereof with ethers, amines, acid anhydrides, ketones, diazonium salts and the like; phosphoric acid and partial esters thereof including n-butyl orthophosphate, diethyl orthophosphate, and hexaethyl tetraphosphate; amino compounds, such as triethylamine, ethylene diamine, diethylamine, diethylene triamine, triethylene tetraamine, m-phenylenediamine, dicyandiamide, and melamine; salts of inorganic acids, such as zinc fluoborate, potassium persulfate, nickel fluoborate, magnesium perchlorate, and the like.

The amount of the curing agents employed may vary over a considerable range, such as from 1% to 200% by weight of the polyepoxide, with the exact range depending on the particular type of agent selected. With curing agents having replaceable hydrogen, such as the amine agents, amounts of agent generally employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the materials being polymerized. With phosphoric acid and esters thereof, preferred amounts vary from about 1% to 10% by weight. The amino compounds are preferably employed in amounts varying from about 3% to 25% and with salts of the inorganic acids, such as the salts of fluoboric acid, amounts varying from about 3% to 20% by weight preferably are employed. Other curing agents are preferably employed in amounts varying from 1% to 20%, by weight.

The cure of the polyepoxides may be effected by mixing the curing agent with the polyepoxide and heating. Curing temperatures range generally from room temperature to about 200° C., the exact range largely depending on the curing agent selected. Active curing agents, such as the aliphatic amines may be utilized, for example, at lower temperatures, such as from room temperature to about 60° C. Less active materials, such as polybasic anhydrides and acids, generally require higher temperatures, such as temperatures ranging from about 60° C. to 150° C. Aromatic amines are preferably employed at the higher temperatures, e.g., temperatures ranging from 60° C. to 150° C.

As previously indicated, the polyepoxy esters of the dimers and trimers have unexpected utility because of their high flexibility. When they are copolymerized with other epoxy resins they may impart flexibility without substantially reducing the tensile strength or other desirable physical properties.

The present invention is described in greater detail in the following examples.

Example I 864 grams of trimer acid (identified as 3055–S, product of Emery Industries, Inc.) which comprises about 75% of trimer fatty acid and about 25% dimer fatty acid is dissolved in 2700 ml. of benzene and 176 grams of KOH (85%) are added. After stirring for one hour at 40° C. the benzene and water are distilled off. To the residue is added 9.0 grams of benzyl trimethyl ammonium chloride as a catalyst and 3312 grams of epichlorohydrin. The mixture is heated and reacted at 100° C. for about 1 hour after which the reaction product is filtered at 35° C. to separate potassium chloride. The excess epichlorohydrin is distilled off leaving a liquid product identified as the polyglycidyl ester of the starting acid; epoxy value 0.242 eq./100 g., OH value, 0.019.

Example II

A mixture comprising about 21.5 grams of trimer and about 68.5 grams of dimer fatty acids, identified as 3065–S (product of Emery Industries, Inc.) are dissolved in 300 ml. of benzene and 19.8 grams of 85% potassium hydroxide in 15 ml. of water. After stirring for one hour at room temperature the benzene and water are distilled off. To the residue is added 368 grams of epichlorohydrin. With constant stirring the mixture is heated for 90 minutes at a temperature of 100–105° C. After cooling, potassium chloride is filtered off and the excess epichlorohydrin is removed. There is obtained a fluid product, identified as the polyglycidyl ester of the starting acid mixture having an epoxy value of 0.23 eq./100 g., OH value of 0.04 eq./100 g. and an ester value of 0.293.

Example III 90 grams of the dimer of linoleic acid are dissolved in benzene and 16.8 parts KOH (19.8 parts of 85% KOH in 15 parts water) is stirred into the mixture. After about 1 hour, with constant agitation, the benzene is distilled off together with the water. To the dry salt which remains is added 368 parts of epichlorohydrin. The mixture is stirred and heated to 100° C. for ½ hour. The temperature is then maintained at 100° C. to 105° C. for one hour. The potassium chloride formed during the reaction is filtered off and the excess epichlorohydrin is topped at 100° C. at 1–2 mm. Hg. The resulting product is a liquid having properties similar to the product of Example I and is identified as diglycidyl ester of the dimer of linoleic acid.

Example IV 96 parts of the trimer acid of linoleic acid is dissolved in 300 parts of benzene and 16.8 parts of KOH (19.8 parts of 85% KOH in 15 parts of water) is stirred into the mixture. After stirring for one hour, the benzene and water are distilled off leaving solid potassium salts. The salt is broken up and 368 parts of epichlorohydrin is added. 1 part of benzene trimethyl ammonium chloride is added as a catalyst. The mixture is heated for 1 hour at 95° C. The mixture is then filtered and the salt washed with benzene. The filtrate is then distilled to remove benzene and excess epichlorohydrin. The resulting product is a liquid having an epoxy value of 0.233 eq./100 g., —OH value of 0.03 eq./100 g., and an ester value of 0.326 eq./100 g. It is identified as the triglycidyl ester of the trimer of linoleic acid.

Example V

The procedure of Example I is repeated using 100 parts of a mixture comprising the dimer and trimer of 8,12-eicosadiene-1,20-dioic acid and 730 parts of epichlorohydrin. The final product is identified as a complex mixture of polyglycidyl esters of the dimer and trimer of 8,12-eicosadiene-1,20-dioic acid.

Example VI

The dimer acid prepared from oleic acid and linoleic acid is esterified with an excess of crotyl alcohol in the presence of a sodium hydroxide. Thereafter the ester of the dimer is separated and reacted with an excess of peracetic acid at 50° C. The product is purified from benzene and identified as the diepoxy crotyl ester of the dimer acid.

Example VII

By the alcoholysis procedure as in Example VI, di(3,4-epoxy)cyclohexyl ester of the dimer of 7,11-octadecadiene-1,18-dioic acid is prepared from cyclohexanol and the dimer of 7,11-octadecadiene-1,18-dioic acid followed by epoxidation with peracetic acid.

Example VIII 30 grams of the trimer acid (identified as 3055-S, a product of Emery Industries, Inc.) is blended with 130 grams of diglycidyl ether and 0.5 gram of diethanolamine. The mixture is heated at 80° C. for 2 hours. Thereafter the temperature is raised to 120° C. and held at that temperature for an additional hour. Excess diglycidyl ether is distilled off at 75° C. and 2.5 mm. Hg. The final temperature is 125° C. at 2 mm. Hg. There is obtained 44 grams of product identified as the polyhydroxy glycidyl ether of the trimer acid having from 2 to 3 ester radicals of the formula

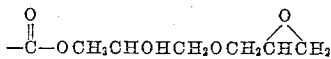

per molecule of acid.

Example IX

The polyglycidyl ester of the trimer acid (2 parts) prepared as in Example I is mixed with 1 part of the resin obtained from epichlorohydrin and 2,2-bis(4-hydroxyphenyl)propane, designated as EPON 828, a product of Shell Chemical Corporation, together with 14 parts per hundred of piperazine. After thoroughly mixing a casting is formed which is cured for 2 hours at 125° C. The casting has a tensile strength of 3,390 p.s.i., an elongation of 190% at break, and a stiffness of 12,200 p.s.i. The EPON 828 is described as having a molecular weight in the order of 350 and an epoxide value of about 0.51 eq./100 g.

In a like manner 7 parts per hundred of diethyltriamine is employed as the curing agent. The cure cycle is 4 hours at 150° C. The casting has a stiffness of 20,000 p.s.i.

Example X

Two parts of the diglycidyl ester of the dimer acid prepared according to the procedure of Example II, is blended with 1 part of EPON 828, a product of Shell Chemical Corporation, together with 14 parts per 100 of piperazine. A casting is prepared and cured for 4 hours at 125° C. It has a tensile strength of 2,455 p.s.i., and elongation of 250% at break, a tear strength of 315 pounds per inch of thickness and a stiffness of 1,150 p.s.i.

A similar composition cured with diethylene triamine shows considerably less tensile strength and elongation although the stiffness is considerably higher.

Example XI

The procedure of Example IX is repeated using the glycidyl ester of Example III. The castings show similar tensile strength and improved flexibility.

Example XII

The procedure of Example IX is repeated except that the curing agent is 57 parts per hundred of 8,12-eicosadiene-1,20-dioic acid and 1 part of benzyl dimethyl amine promoter. The cure cycle is 2 hours at 125° C. The casting has a tensile strength of 2,180 p.s.i. and an elongation of 370% at break.

Example XIII

The procedure of Example IX is repeated except that a casting is prepared from the tetraglycidyl ester of the dimer of 8,12-eicosadiene-1,20-dioic acid cured with piperizine in the presence of EPON 828. The thus prepared casting shows improved elongation without substantial sacrifice of tensile strength.

Example XIV

The polyglycidyl ester of Example I is cured with 10 parts per hundred of piperazine. The cure is at 125° C. for four hours. The resulting product, by itself, has low tensile strength and flexibility.

Example XV

The polyepoxide of Example VIII is cured with a stoichiometric amount of diethylene diamine at 100° C. for 1 hour to yield a flexible polymer. In a similar manner 2,5-dimethyl piperazine is used as the curing agent. The polymer thus obtained has good extensibility and flexibility.

In a similar manner, the triglycidyl ester of the trimer of linoleic acid, and other epoxy esters of the dimers and/or trimers of long chain unsaturated acids will improve the flexibility of a variety of epoxy-containing polymers.

In addition to the above-described utility, the epoxy esters of this invention are found to be extremely useful in road surfacing compositions, as asphalt and concrete, as they contribute to improve the weather and wear resistance. Such utility is described in greater detail in copending application Serial No. 660,455, filed May 21, 1957, the disclosure of which is hereby incorporated by reference.

I claim as my invention:

1. Unsubstituted polyglycidyl esters of long chain ethylenically unsaturated aliphatic hydrocarbon acids selected from the group consisting of the dimers of long chain unsaturated aliphatic hydrocarbon acids, trimers of long chain unsaturated aliphatic hydrocarbon acid, and mixtures thereof.
2. Diglycidyl ester of the dimer of linoleic acid.
3. Triglycidyl ester of the trimer of linoleic acid.
4. Unsubstituted polyglycidyl ester of a mixture comprising as its only components the dimers and trimers of linoleic acid.
5. Unsubstituted polyglycidyl ester of mixed dimer and trimer acids of linoleic and oleic acid.
6. Solid flexible homopolymers of the esters of claim 1.
7. Unsubstituted polyglycidyl esters of dimers of linoleic acid.
8. Unsubstituted polyglycidyl esters of trimers of oleic acid.
9. Unsubstituted polyglycidyl esters of dimers of oleic acid.
10. Unsubstituted polyglycidyl esters of trimers of oleic acid.

References Cited in the file of this patent
UNITED STATES PATENTS

| | | |
|---|---|---|
| 2,448,602 | Kester et al. | Sept. 7, 1948 |
| 2,761,870 | Payne et al. | Sept. 4, 1956 |
| 2,771,472 | Ritter et al. | Nov. 20, 1956 |
| 2,781,333 | Updegroff | Feb. 12, 1957 |